July 22, 1941.  R. A. CAMERON  2,250,150
ICE CREAM DISPENSING DEVICE
Filed June 4, 1940  4 Sheets-Sheet 1
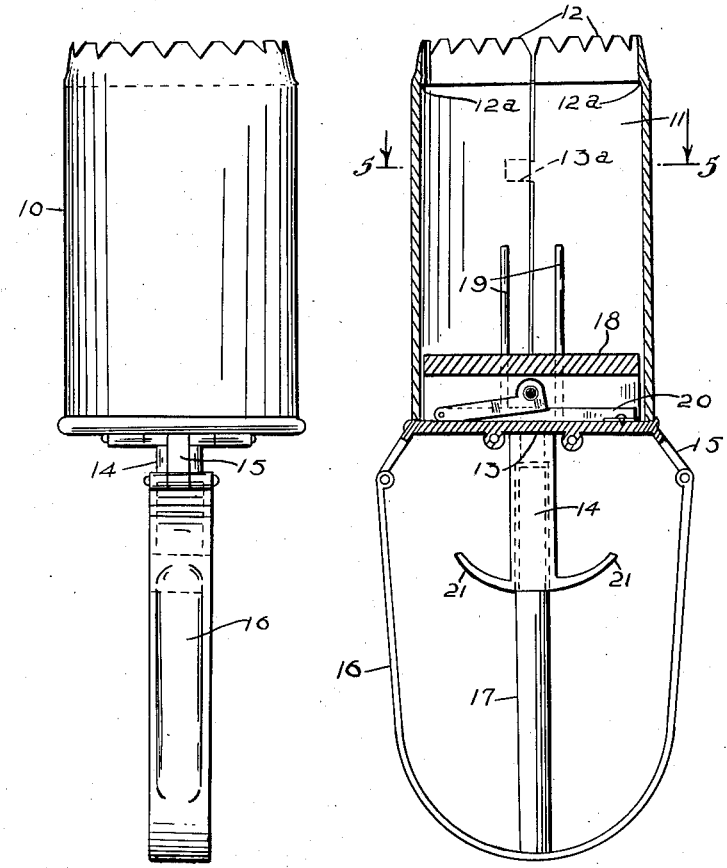
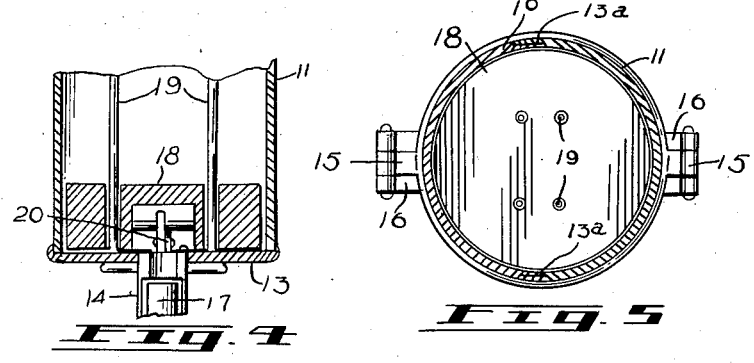
INVENTOR
Roland A. Cameron
By Ralph Burch
Attorney July 22, 1941.   R. A. CAMERON   2,250,150
ICE CREAM DISPENSING DEVICE
Filed June 4, 1940   4 Sheets-Sheet 2
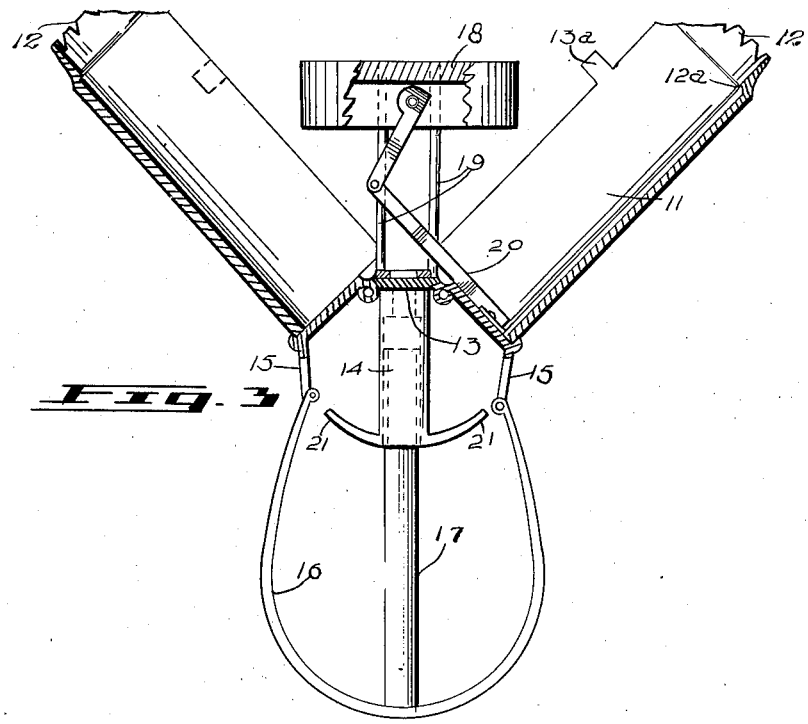
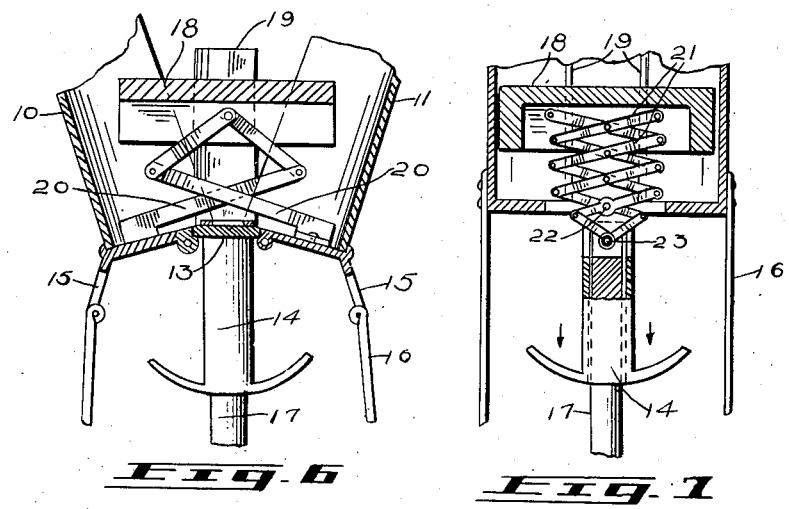
INVENTOR
Roland A. Cameron
By Ralph Burch
Attorney July 22, 1941. R. A. CAMERON 2,250,150
ICE CREAM DISPENSING DEVICE
Filed June 4, 1940 4 Sheets-Sheet 3
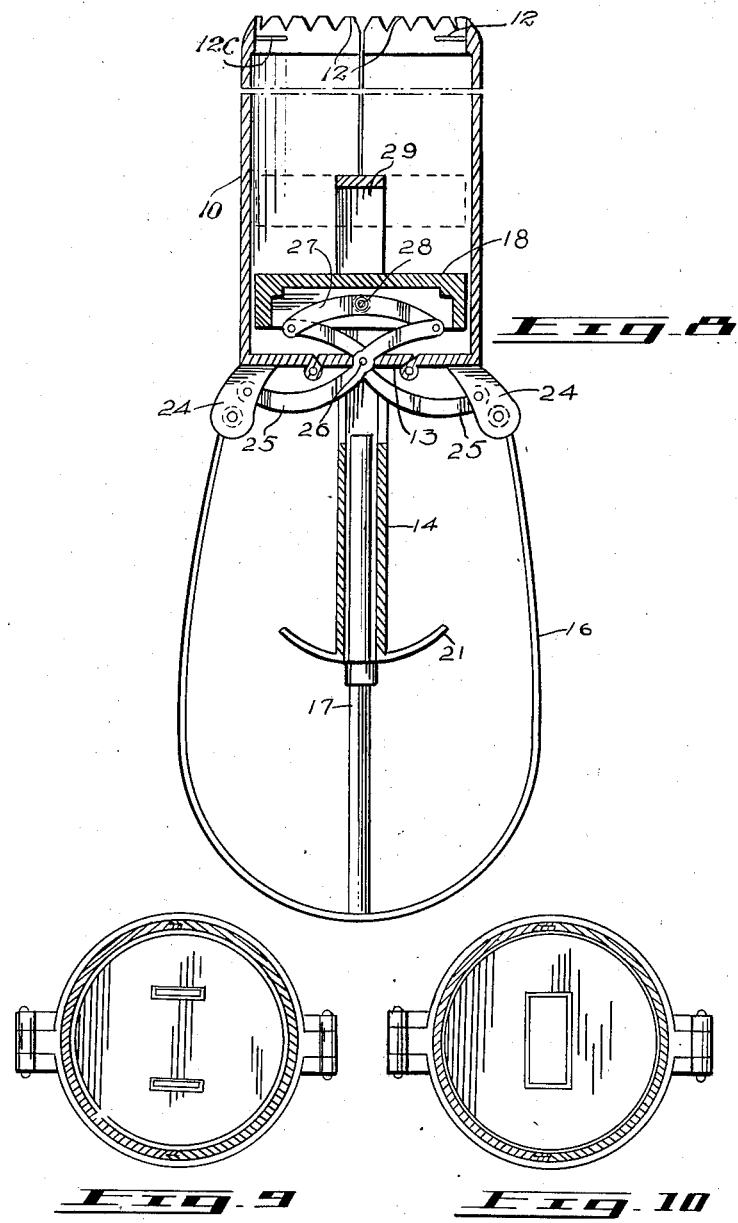
INVENTOR
Roland A. Cameron
By Ralph Burch
Attorney

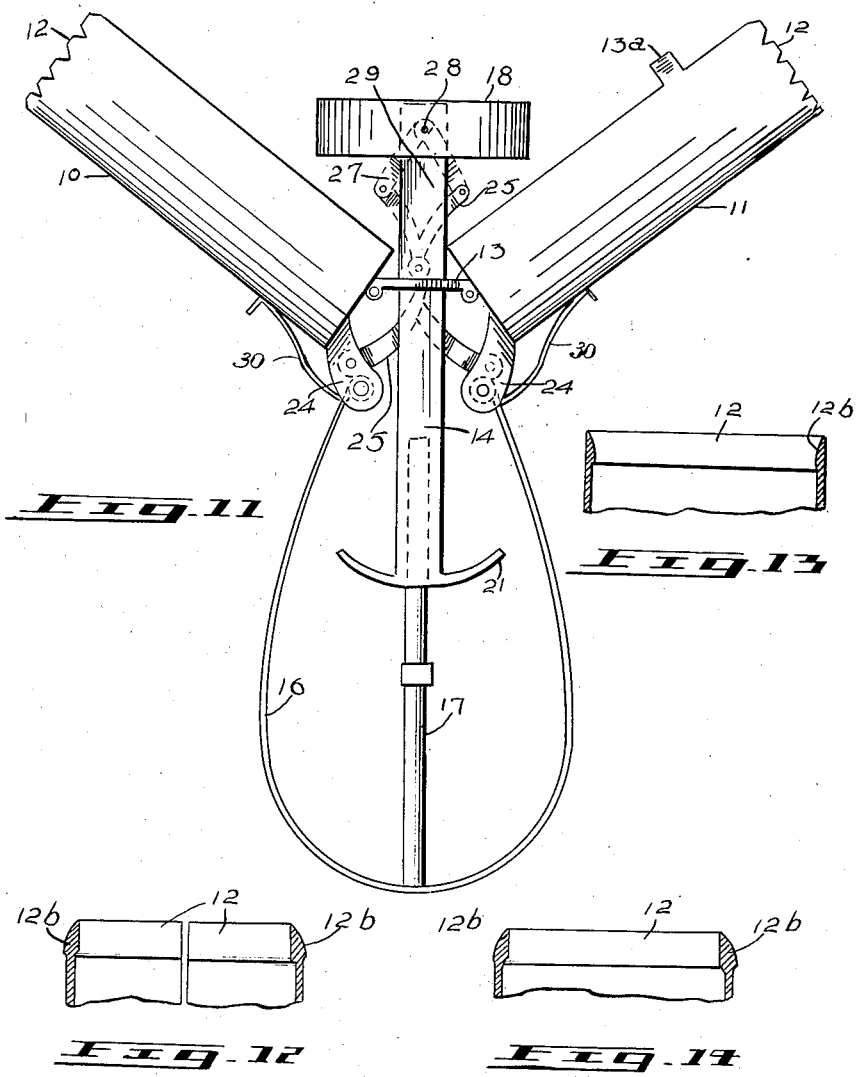

Patented July 22, 1941

2,250,150

UNITED STATES PATENT OFFICE 2,250,150

ICE CREAM DISPENSING DEVICE

Roland Allen Cameron, Ottawa, Ontario, Canada

Application June 4, 1940, Serial No. 338,817

7 Claims. (Cl. 107—48)

This invention relates to improvements in an ice cream dispensing device. Its primary object being to provide means to serve ice cream in a cylindrical or roll form.

A further object of the invention is to construct a device that will cut into the ice cream with comparative ease by a straight thrust and will form the same into the desired shape when cut.

Another object of the invention is to provide means to release the contents of the dispenser, said means being manually operated.

Another object of the invention is to provide a means to permit the entry in cylindrical or roll form a number of flavours of ice cream maintained within the one unit.

Another object of the invention is to provide a means to permit easy insertion and extraction within the bulk ice cream.

With these and other objects in view that may appear while the description proceeds the invention consists in the novel construction and arrangement of parts as hereinafter more specifically set forth, claimed and shown in the accompanying drawings forming part of this application and in which:

Figure 1 is an elevation of my invention.

Figure 2 is an elevation at right angles to Figure 1, partially in section.

Figure 3 is a similar view showing the dispenser open.

Figure 4 is a detail sectional view of the ejector.

Figure 5 is a sectional view on the line 5—5 of Figure 2.

Figure 6 is an alternative construction view of the ejector mechanism.

Figure 7 is a further alternative construction view of the same.

Figure 8 is a sectional view of the dispenser showing another alternative construction.

Figures 9 and 10 show modifications of the ejector guides.

Figure 11 is an elevation showing the dispenser in open position.

Figure 12 is a modified form of the cutting end of my invention showing shoulders on the inside and outside of the moulds.

Figure 13 is a modified form of my invention showing the extractor in combination with a single mould.

Figure 14 is similar to Figure 13, with the exception that the outer shoulder is shown thereon.

Referring more in detail to the drawings in which similar reference characters designate corresponding parts throughout the several views it will be seen the invention consists of a mould or cylindrical cutter formed in two corresponding halves 10 and 11 having a serrated or plain cutting edge 12, a trimmer or cutting means 12c, and registering lugs 13a. A shoulder 12a prevents the ice cream from sticking to the inside of the mould. Shoulders 12b prevents the ice cream from sticking to the outside of the mould. The members 10 and 11 are hinged to a stationary cross member 13 which is secured to a tubular guide 14. Lugs 15 depend angularly from the said members 10 and 11 and are pivotally engaged by a U shaped spring member 16. A push rod 17 is fixed centrally to the said spring member 16 and is slidably arranged in the tubular guide 14. An ejector consisting of a circular member 18 is positioned in the mould and is slidable on guide members 19 fixed to the stationary member 13. Hinged lever arms 20 are fixed to the base of one of the mould members and connected pivotally to the ejector at the other end. Finger lugs 21 are formed on the guide 14. By this means the dispenser is closed by placing the palm of the hand against the spring 16 and drawing the guide member outward with the fingers. After this mould is filled the grip is gradually released and the dispenser will open to the position shown in Fig. 3 by the action of the spring 16.

In the alternate construction shown in Fig. 6, double lever arms 20 are shown. One being attached to each side member of the mould. This construction is designed to provide a more direct thrust on the ejector.

In the construction shown in Fig. 7, a plurality of crossed pivotal arms 21 are attached to the ejector 18 and are pivoted on pins 22 and 23, the former being on the stationary member and the latter on the guide 14 and arranged so that a pull in one direction on the lugs 21 will move the ejector in the opposite direction on the guide members 19.

A further leverage mechanism is shown in Figs. 8 and 11. Lugs 24 are attached to the mould members and curved lever arms 25 are pivotally attached thereto. The arms are pivoted on a central pin 26, and move in a scissors like motion. Links 27 connect the arms to the ejector member 18 on a pin 28. The guide 29 is of rectangular shape and is arranged centrally for the ejector to slide on. Additional springs 30 may be attached to the lugs and engage the sides of the mould.

From the foregoing it will be seen the dispenser may be constructed in a number of modifications wherein the action is substantially similar.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:

1. An ice cream dispenser comprising a cylindrical mould divided longitudinally to form complementary sections, means hingedly connecting the lower ends of said sections to permit outward swinging movement of said sections, means normally holding said sections in an open position, an ejector slidably mounted axially of said cylinder, and means operably connected with said sections for reciprocating said ejector upon movement of said sections.

2. An ice cream dispenser comprising a cylindrical mould divided longitudinally to form complementary sections, means hingedly connecting said sections together for outward swinging movement, spring means normally urging said sections to an open position, an ejector slidably mounted axially of said cylinder, and means operably connected with said sections for reciprocating said ejector upon movement of said sections.

3. An ice cream dispenser comprising a cylindrical mould divided longitudinally to form complementary sections, means hingedly connecting the sections together for outward swinging movement, an ejector slidable longitudinally of said mould, and means operably connecting said ejector with said sections for reciprocating said ejector upon movement of said sections.

4. An ice cream dispenser comprising a cylindrical mould divided longitudinally to form complementary sections, means hingedly connecting said sections together for outward swinging movement, an ejector slidable longitudinally of said mould, and a linkage mechanism connecting said ejector with said sections for reciprocating the ejector upon movement of said sections.

5. An ice cream dispenser comprising a cylindrical mould divided longitudinally to form complementary sections, means hingedly connecting said sections together for outward swinging movement, and a U-shaped spring band having its ends pivotally connected to the lower ends of the sections respectively and normally swinging said sections to an open position, said spring being adapted to move said sections to a closed position when pressure is applied to the intermediate portion of said spring.

6. An ice cream dispenser comprising a cylindrical mould divided longitudinally to form complementary sections, means hingedly connecting the sections together for outward swinging movement, a guide sleeve depending from the bottom of said mould, a U-shaped spring having its ends pivotally connected to the lower ends of the sections respectively and adapted to normally swing said sections to an open position, and a rod extending from the intermediate portion of said spring, said rod being slidable in said guide sleeve and adapted to guide the movement of said spring when pressure is applied to the intermediate portion of the spring to swing said sections to a closed position.

7. An ice cream dispenser comprising a cylindrical mould divided longitudinally to form complementary sections, means hingedly connecting said sections together for outward swinging movement, a U-shaped spring having its ends pivotally connected to the lower ends of said sections respectively adapted to normally swing said sections to open position, said spring being operable to swing said sections to a closed position when compressed at its intermediate portion, an ejector slidable in said mould, and means operably connecting said ejector to said sections for reciprocating said ejector upon opening and closing of said sections.

R. ALLEN CAMERON.